Figure 1:
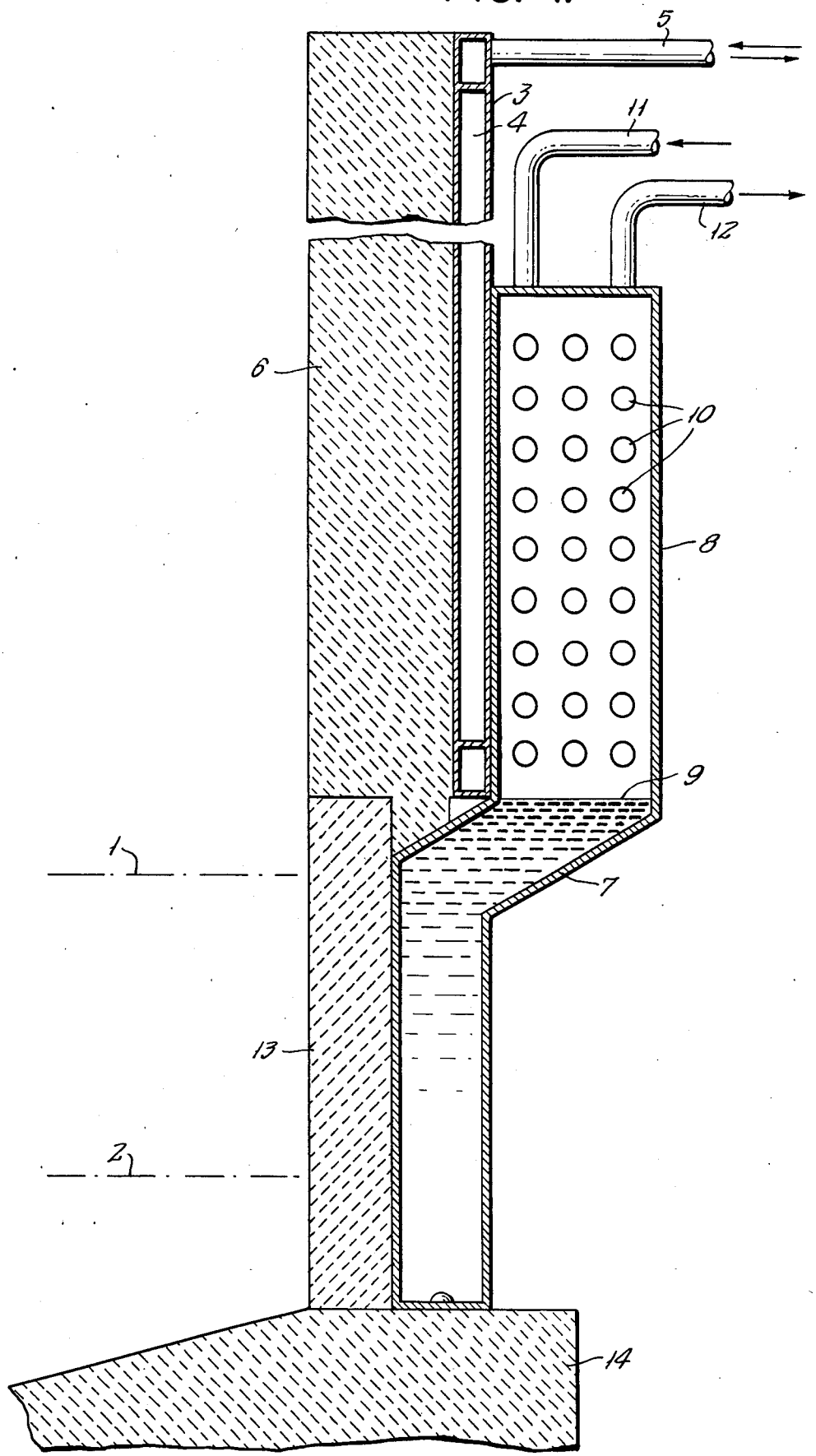

United States Patent [19]

Aune et al.

[11] Patent Number: 4,674,728
[45] Date of Patent: Jun. 23, 1987

[54] SIDEWALL FOR A METALLURGICAL SMELTING FURNACE

[75] Inventors: Jan A. Aune, Langhus; Per O. Nos, Høn, both of Norway

[73] Assignee: Elkem a/s, Oslo, Norway

[21] Appl. No.: 821,400

[22] Filed: Jan. 22, 1986

[30] Foreign Application Priority Data

Feb. 7, 1985 [NO] Norway ............................ 850460

[51] Int. Cl.⁴ .............................................. C21B 7/10
[52] U.S. Cl. .................................... 266/193; 266/280
[58] Field of Search ............... 266/280, 191, 190, 193, 266/194, 192; 122/6 A, 6 B, 6 R

[56] References Cited

U.S. PATENT DOCUMENTS 3,953,007 4/1976 Van Laar ............................ 266/193
4,121,809 10/1978 Dhelft ................................ 266/193

FOREIGN PATENT DOCUMENTS 2152759 4/1972 Fed. Rep. of Germany .
0783343 11/1980 U.S.S.R. ............................... 266/193

Primary Examiner—L. Dewayne Rutledge
Assistant Examiner—S. Kastler
Attorney, Agent, or Firm—Lucas & Just

[57] ABSTRACT

A sidewall for a metallurgical smelting furnace is disclosed. The sidewall is made from a refractory material; an evaporation cooling panel; and a convection cooling panel. The refractory material faces the interior of the furnace. A slot is formed between the evaporation cooling panel and the refractory material such that the convection cooling panel is positioned therebetween. The evaporation cooling panel and the convection cooling panel work together to cool the sidewall of the metallurgical smelting furnace.

17 Claims, 4 Drawing Figures

SIDEWALL FOR A METALLURGICAL SMELTING FURNACE

The present invention relates to a sidewall for smelting furnaces. The invention is of particular advantage for smelting processes where great amounts of aggressive slag is handled, such as processes for smelting of ferronickel and copper/nickel matte and electric smelting of mineral slag for production of mineral wool.

Smelting furnaces for production of metals, smelting of slag etc., are usually equipped with a furnace pot having an inner sidewall refractory lining and a refractory bottom lining. The quality and the thickness of the sidewall refractory lining are dependent on the products which are to be produced in the furnace.

For many processes the sidewall refractory lining has a very limited lifetime as the lining is exposed to a very strong mechanical, thermal and chemical wear. The sidewall refractory lining therefore has to be repaired very often and even has to be renewed with short intervals. For slag processes the slag will often have a strongly eroding effect on the sidewall refractory lining which results in that the sidewall refractory lining is worn very fast in the are A where the liquid slag appears.

It is known to increase the lifetime of the sidewall refractory lining by forced cooling of the outside of the furnace pot. The heat transport through the side wall refractory lining is thereby increased and the temperature in the sidewall refractory lining will be lowered. It is further known to incorporate channels for a cooling medium in the sidewall refractory lining whereby the temperature in the refractory lining can be lowered to such an extent that a layer of frozen reaction products, for example slag, is built up on the side of the refractory lining which faces against the inside of the furnace.

The above-mentioned methods for increasing the lifetime of the sidewall refractory lining have, however, a lot of drawbacks and disadvantages. By forced cooling by for example spraying of water on the outside of the furnace shell, the heat losses from the furnace is heavily increased which reduces the thermal efficiency of the furnace. It is further difficult to concentrate the cooling to the areas of the furnace shell where the thermal load on the furnace is highest. Outside cooling of the furnace shell by water also involves a high safety risk as water leakages in connection with liquid metal or slag involves danger of serious explosions. Sidewall refractory linings having internal channels for cooling water have the drawback that it is not possible to inspect the channels without a complete demantling of the refractory lining. Such a demantling of the refractory lining implies that the smelting furnace has to be shut down for a period of from one to six weeks depending on the size of the furnace. Even a very small leakage on one of the cooling channels which are built into the refractory lining may be disastrous as the cooling liquid will penetrate into the furnace where the liquid will evaporate and uninvoidably cause explosion in the smelting furnace. Sidewall refractory linings of the above mentioned known kinds have therefore not come into extensively use.

A common drawback of the two above-mentioned methods of increasing the lifetime of sidewall refractory linings is that the linings still will be exposed to severe chemical attack as the quality of the linings will be the same as for refractory linings having no forced cooling.

For production of ferronickel in electric smelting furnaces it has been necessary to substantially increase the furnace pot diameter in order to lower the thermal stress on the sidewall refractory lining. Thus the furnaces are to be larger than what is necessary for process technical reasons. Due to the increased diameter the investment costs of such furnaces are very high.

It is an object of the present invention to overcome the above drawbacks and disadvantages of the known sidewall refractory linings which makes it possible to design smelting furnaces according to what is known about the smelting process and not as it has been necessary up to now, to design the furnaces in order to obtain a reasonable lifetime for the sidewall refractory lining.

Accordingly, the present invention relates to a sidewall for electric smelting furnaces, preferably furnaces for production of ferronickel and/or smelting of copper/nickel matte where the refractory lining at least in part consists of a layer of frozen slag.

According to the present invention the upper part of the sidewall which is intended to be in contact with liquid slag, comprises a plurality of convection cooled panels which have internal channels for circulation of a none-explosive liquid cooling medium which preferably works within a temperature interval between 200°–400° C. On the inside of the convection cooled panels there are arranged a refractory lining, preferably a carbon lining which is not resistant against liquid slag. The thickness of the carbon lining is choosen so that when the smelting furnace is in normal operation, the heat flux through the carbon lining will be so high that a protective layer of frozen slag will exist on the side of the carbon lining facing into the furnace.

Below the convection cooled panels there is arranged a plurality of evaporation cooled panels which extend from the bottom refractory lining and upwardly above the lower ends of the convection cooling panels. The evaporation cooling panels are intended to contain a vaporizeable cooling medium with a boiling point in the interval between 0° and 500° C. The level of cooling medium in the evaporation cooling panels is at least up to the lower ends of the convection cooled panels. In the upper part of the evaporation cooling panels there are arranged means for condensation of evaporated cooling medium. On the side of the evaporation cooling panels which faces inwardly there are provided a refractory lining. This refractory lining is resistent against the metal which are produced in the furnace, but not against aggressive slag.

According to a preferred embodiment of the present invention another outer set of evaporation cooling panels is arranged in the substantially same vertical level, but at a radial distance from the first evaporation cooling panels. The annular space between the inner and outer sets of evaporation cooling panels is filled with a refractory material. The outer set of evaporation cooling panels are preferably of the same design as the inner set of evaporation cooling panels.

In the area at the lower ends of the convection cooled panels, there is preferably arranged a metal ring with an internal channel for circulation of a cooling liquid. The metal ring is preferably made from copper and ensures a good cooling of the transition zone between the convection cooled panels and the inner set of evaporation cooling panels.

In order to facilitate the contact between the refractory lining and the inner side walls of the evaporation cooling panels, there are provided pipes which extend from the outside through the evaporative cooling panels and stop at the boarder between the refractory lining and the inner sidewalls of the evaporation cooling panels. A particulate material such as for example carbon or graphite powder can thereby from time to time be blown into the pipes to fill up any voids or cavities between the refractory lining and the inner sidewalls of the evaporation cooling panels. This will ensure a good thermal contact between the lining and the panels and thereby also a good and even flow of heat.

When the furnace is in operation the temperature in the inner set of the evaporation cooling panels will very soon reach the boiling point of the cooling medium contained in the panels. The cooling medium will thereby begin to evaporate and the produced vapour will flow up to the upper part of the evaporation cooling panels where the vapour will come into contact with the condensation means and the vapour thus condenses. The heat of condensation is transferred to the cooling liquid which circulate in the pipes of the condensation means while the condensed vapour will flow downwardly in the evaporation cooling panels. The temperature in the evaporation cooling panels will thereby be practically constant and equal the boiling point of the cooling medium. Variation in the temperature stress will only give a change in the evaporation rate of the cooling medium.

The thickness of the refractory lining arranged on the side of the evaporation cooling panels which faces inwardly into the furnace is choosen so that when the refractory lining is in contact with liquid slag, a layer of solid slag will freeze on the refractory lining. The refractory lining will thereby be protected against attack from aggressive liquid slag. If, on the other hand molten metal comes into contact with the lining, the layer of froozen slag will, due to the high thermal conductivity of molten metal, melt away and the molten metal will come into contact with the refractory lining. It is therefore important to use a refractory lining which is not attacked by molten metal.

The sidewall according to the present invention is easy to maintain as the cooling panels themselves constitute the furnace shell. This makes it easy to inspect and control the evaporation cooling panels. Each of the evaporation cooling panels can be demounted and new ones installed very fast. By systematical replacing of the cooling panels after a preset operation time of the furnace, leakages will be avoided and it is thereby possible to obtain a practically unlimited lifetime for the sidewall refractory lining.

Figure 2:
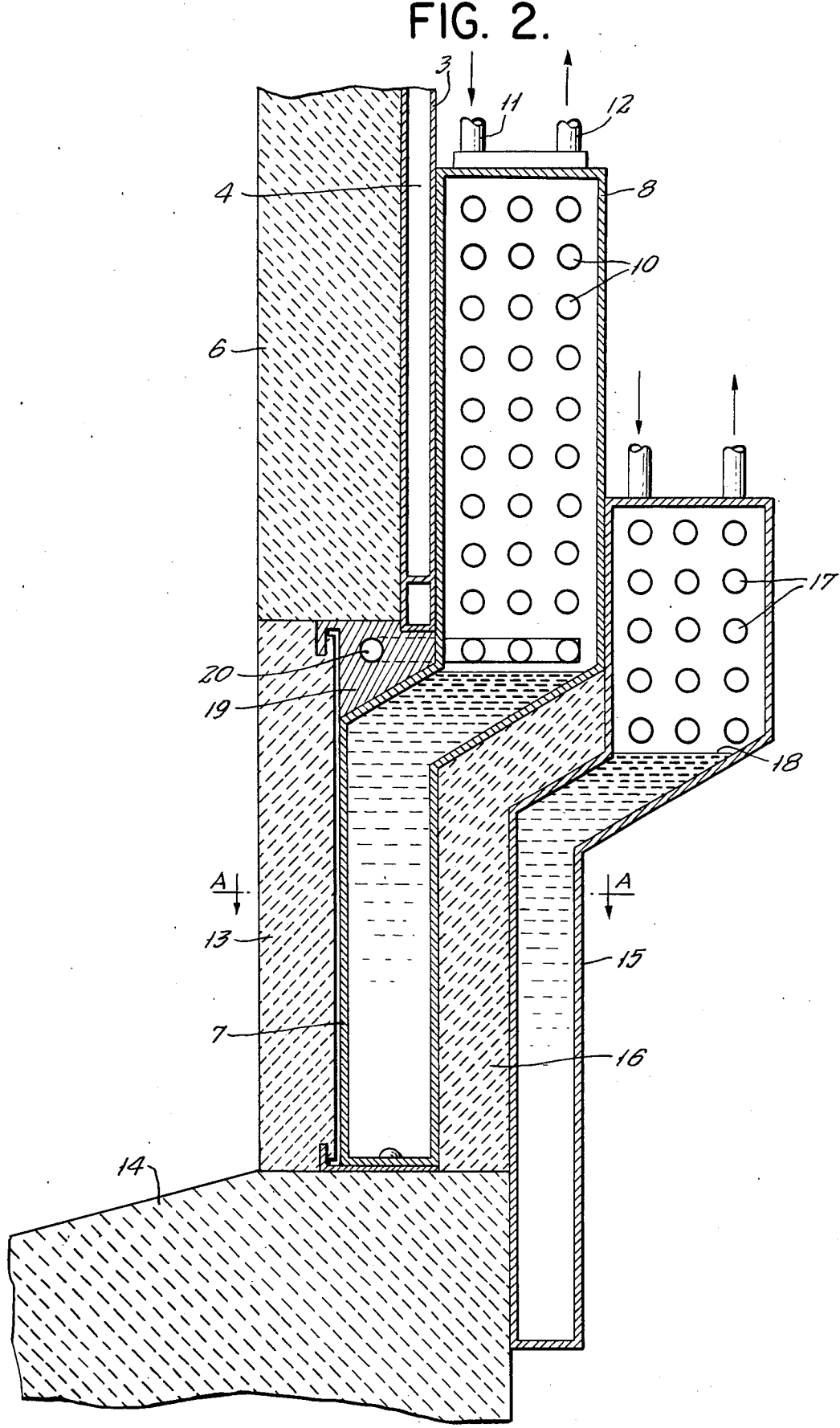
Figure 3:
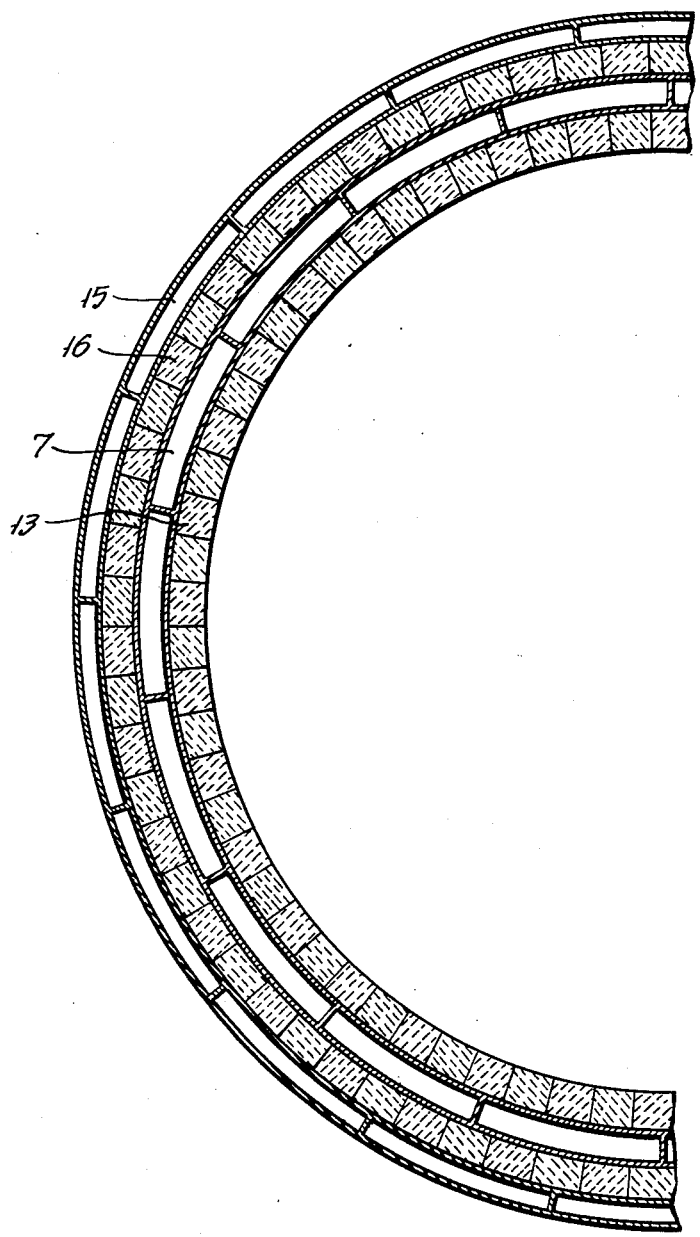
Figure 4:
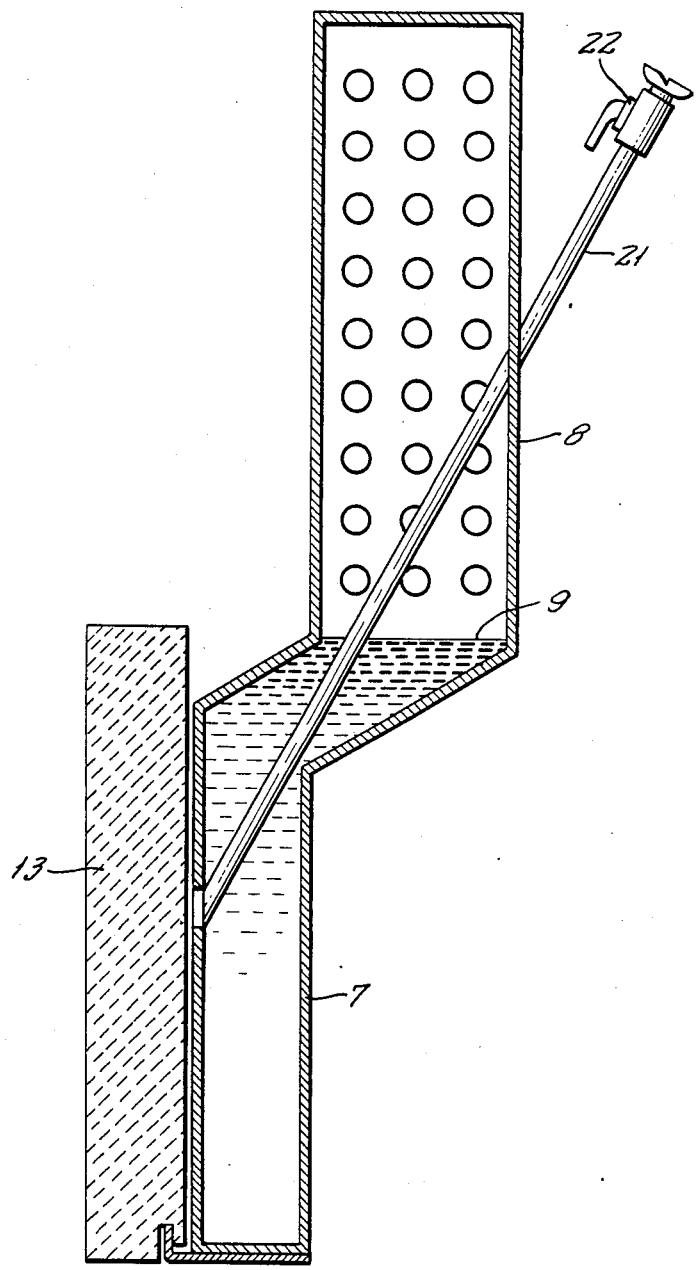

For more complete understanding of the present invention reference is made to the accompanying drawings wherein;

FIG. 1 shows a vertical sectional view through a sidewall according to the present invention, FIG. 2 shows a vertical sectional view through the sidewall according to another embodiment of the present invention, FIG. 3 shows a horizontal view through line A-A on FIG. 2, and FIG. 4 shows a vertical sectional view through one of the evaporation cooling panels of the present invention.

The furnace pot shown on FIG. 1 is designed for production of metals or alloys such as for example ferronickel. In this process there will be a metal or alloy bath in the bottom of the furnace and a slag bath upon the metal or alloy bath. As this kind of furnaces are tapped discontinually the level of the metal in the furnace will vary between the levels indicated by the reference numerals 1 and 2 on FIG. 1. The area of the sidewall between the reference numerals 1 and 2 will therefore alternatively be in contact with metal and slag.

The upper part of the sidewall is built up from convection cooled panels 3. The convection cooled panels 3 have internal channels 4 for circulation of a noneexplosive liquid cooling medium which preferably works within a temperature interval between 200° to 400° C. The convection cooled panels 3 are equipped with pipes 5 for supply of liquid cooling medium. The cooling medium is cooled in means (not shown) which are placed at a distance from the furnace. The convection cooled panels extend from the top of the furnace pot and down to a level just above the highest possible level of metal 1 in the furnace.

On the inside of the convection cooled panels 3 there is arranged a refractory lining 6, preferably a carbon lining. The thickness of the lining 6 is choosen such that when the furnace is in normal operation the heat flux through the lining 6 will be so great that a layer of solid slag will freeze on the inside of the lining 6. This layer of frozen slag will protect the lining 6 which in itself is not durable against the liquid aggressive slag. This upper part of the sidewall refractory lining will thereby have a practically unlimited lifetime.

Below the convection cooled panels 3 there is arranged evaporation cooling panels 7. The upper parts 8 of the evaporation cooling panels 7 extends out from and above the lower parts of the convection cooled panels 3. The evaporation cooling panels 7 are intended to contain an vaporizeable cooling medium with a boiling point in the interval between 0° and 500° C. in closed internal channels. The level of the cooling medium in the evaporation cooling panels 7 is at least up to the lower end of the convection cooled panels 3 and is shown with reference numeral 9 in FIG. 1. In the upper part of the evaporation cooling panels 7 there are arranged condensation means 10. The condensation means 10 comprises a plurality of pipes 10 in which a liquid cooling medium circulate. Liquid cooling medium is supplied to the condensation means 10 through pipes 11 and withdrawn through pipes 12. The object of the condensation means 10 will be further described later.

On the inside of the evaporation cooling panels 7 there is arranged a refractory lining 13 which is resistant against the metal which are produced in the furnace. As will be evident from FIG. 1, at least the upper part of the refractory lining 13 will alternatively be in contact with both liquid slag and metal. The refractory lining 13 is, however, not resistant against aggressive slag. The evaporation cooling panels 7 and the refractory lining 13 rest on a conventional refractory bottom lining 14.

When the smelting furnace is in operation there will be a heat flux radially outwards through the refractory lining 13. When the temperature inside the evaporation cooling panels 7 reaches the boiling point of the cooling medium which is contained in the panels 7, the cooling medium will start vaporizing and heat is thereby transported with the vapour to the upper part 8 of the evaporation cooling panels 7. Hence the vapour will come into contact with the condensation pipes 10 and the vapour will condense and the condensate will flow downwardly in the panels 7. The heat of vaporization will thereby be transferred to the cooling medium which circulates in the condensation pipes 10. The temperature in the evaporation cooling panels 7 will thereby be constant and unindependently of the heat flux through the refractory lining 13.

By choosing the thickness of the refractory lining 13 so that when slag is in contact with the refractory lining 13 a layer of froozen slag will be created, the refractory lining 13 will be effectively protected against the aggressive liquid slag. The layer of froozen slag will melt away when the refractory lining 13 comes into contact with molten metal. The refractory lining is, however, resistant against liquid metal and the refractory lining will therefore have a very long lifetime as it as described above, will be automatically protected against attack from liquid aggressive slag.

In the embodiment of the present invention shown in FIG. 2, there is in addition to the above mentioned evaporation cooling panels 7 arranged a set of outer evaporation cooling panels 15 which are arranged in the substantially same vertical level, but at a radial distance from the evaporation cooling panels 7. The outer set of evaporation cooling panels 15 is preferably sideways displaced in proportion to the inner set of evaporation cooling panels 7. The radial annulus between the inner set of evaporation cooling panels 7 and the outer set of evaporation cooling panels 15 is filled with a refractory material 16. The outer set of evaporation cooling panels 15 is preferably of the same design as the inner set of evaporation cooling panels 7 and have at their upper ends condensation means 17. The intention of the outer set of evaporation cooling panels 15 is to act as a backup and safety means in case one or more of the inner evaporation cooling panels 7 fail. By normal furnace operation the outer set of evaporation cooling panels 15 are filled with a vaporizable cooling medium to the level indicated by reference numeral 18 on FIG. 2. Because of the cooling effect of the inner set of evaporation cooling panels 7 the temperature in the outer set of evaporation cooling panels 15 will normally be lower than the boiling point of the cooling medium contained in the panels 15. The outer set of evaporation cooling panels 15 will therefore normally be passive. However, as soon as one or more of the inner evaporation cooling panels 7 fails, the temperature will increase radially outwards and one or more of the outer evaporation cooling panels 15 will thereby be activated and provide for sufficient cooling.

In order to obtain sufficient cooling of the area between the lower ends of the convection cooled panels 3 and the evaporation cooling panels 7, there it is preferably arranged a liquid cooled metal ring on the inside of the evaporation cooling panels 7. The liquid cooled metal ring is shown by reference numeral 19 on FIG. 2. The ring 19 can be split into sections and have an internal channel 20 for circulation of a cooling liquid. According to a prefered embodiment the channel 20 in the ring 19 is connected to the condensation pipes 10 in the evaporation cooling panels 7 in such a way that the cooling liquid which circulates in the pipes 10 also will circulate through the channels 20. The ring 19 is preferably made from copper or a copper alloy.

In order to achieve a good thermal contact between the refractory lining 13 and the inside of the evaporation cooling panels 7 it is according to one embodiment of the present invention arranged pipes 21 (see FIG. 4) which extend through the evaporation cooling panels 7 and stops at the boundary between the refractory lining 13 and the inner side of the evaporation cooling panels 7. The pipes 21 have at their outer ends closeably valves 22. A hose or the like can be coupled to the outer ends of the pipes 21 in order to inject a particulate material, preferably a carbon material into the boundary between the refractory lining 13 and the evaporation cooling panels 7 in order to enhance the thermal contact. The injection of powdery material can be repeated from time to time in order to maintain a good thermal contact. A good and stable heat transfer is thereby ensured over the whole area of the evaporation cooling panels 7.

The sidewalls according to the present invention can be adapted both for rectangular furnaces and circular furnaces and combinations thereof. For circular furnaces it is preferred to use evaporation cooling panels having a radius which is substantially the same as the radius of the furnace pot. The cooling panels are placed side by side and can be kept together by any known methods, for example by horizontally rails that runs about the outside of the cooling panels.

What is claimed is:

1. Sidewall for a metallurgical smelting furnace, said furnace having an interior for containing liquid metal and slag, said sidewalls comprising:
   (a) an evaporation panel, one side of said evaporation panel facing the interior of said furnace, said one side being divided horizontally between a lower and an upper portion;
   (b) a first refractory lining positioned against the lower portion of said one side of said evaporation panel;
   (c) a second refractory lining forming a wall above and continuous with said first lining thereby forming an interior wall of said furnace, said second lining and the upper portion of said evaporation panel forming a slot therebetween; and
   (d) a convection cooling panel positioned in the slot, said evaporation panel and said convection panel operating to cool said interior wall of said furnace.

2. Sidewall according to claim 1, wherein said second refractory lining on the inside of the convection cooled panels is made from a carbonaceous material.

3. Sidewall according to claim 1, wherein said first refractory lining on the inside of the evaporation cooling panel is made of a refractory material that is not stable against attack by liquid slag, said first refractory material is resistant to attack by the metal or alloy which is produced in the furnace.

4. Sidewall according to claim 1, wherein a pipe extends from the outside of the evaporation cooling panel to the boundary between the first refractory lining and the evaporation cooling panel.

5. Sidewall according to claim 1 wherein said evaporation panel contains a vaporized cooling medium which is maintained at a liquid level at least up to the bottom of said convection cooling panel; and means for condensing said vaporizable cooling medium when said vaporizable cooling medium is vaporized.

6. Sidewall according to claim 1 wherein said convection cooling panel has internal channels for circulating a liquid cooling medium therein.

7. Sidewall according to claim 1 wherein said first refractory lining is made from a refractory material that is not stable against attack by liquid slag and said first lining has a thermal conductivity and a thickness such that a solid layer of slag forms on said lining when said evaporation panel and said convection panel are cooling said interior wall.

8. Sidewall according to claim 1 wherein said second refractory lining is made of a refractory material that is not suitable against attack by liquid slag and said second lining has a thermal conductivity and a thickness such that a solid layer of slag forms on said lining when said evaporation panel and said convection panel are cooling said interior wall.

9. Sidewall for a metallurgical smelting furnace, said furnace having an interior for containing liquid metal and slag, said sidewall comprising:
   (a) an evaporation panel, one side of said evaporation panel facing the interior of said furnace, said one side being divided horizontally between a lower and an upper portion;
   (b) a first refractory lining positioned against the lower portion of said one side of said evaporation panel;
   (c) a second refractory lining forming a wall above and continuous with said first lining thereby forming an interior wall of said furnace, said second lining and the upper portion of said evaporation panel forming a slot therebetween;
   (d) a convection cooling panel positioned in the slot, said evaporation panel and said convection panel operating to cool said interior wall of said furnace; and
   (e) a ring having an internal channel for circulation of a cooling medium said ring being located in an intermediate zone between the lower end of the convection cooling panel and the evaporation cooling panel.

10. Sidewall for a metallurgical smelting furnace, said furnace having an interior for containing liquid metal and slag, said sidewall comprising:
    (a) an evaporation panel, one side of said evaporation panel facing the interior of said furnace, said one side being divided horizontally between a lower and an upper portion;
    (b) a first refractory lining positioned against the lower portion of said one side of said evaporation panel;
    (c) a second refractory lining forming a wall above and continuous with said first lining thereby forming an interior wall of said furnace, said second lining and the upper portion of said evaporation panel forming a slot therebetween;
    (d) a convection cooling panel positioned in the slot, said evaporation panel and said convection panel operating to cool said interior wall of said furnace; and
    (e) an outer evaporation cooling panel arranged at substantially the same vertical level, but at a radial distance from the evaporation cooling panel.

11. Sidewall according to claim 10, wherein the radial annulus between the evaporation cooling panel and the outer evaporation cooling panel is filled with a refractory material.

12. Sidewall for a metallurgical smelting furnace, said furnace having an interior for containing liquid metal and slag, said sidewall comprising:
    (a) an evaporation panel containing a vaporizable cooling medium and means for condensing said vaporizable cooling medium, one side of said evaporation panel facing the interior of said furnace, said one side being divided horizontally between a lower and an upper portion;
    (b) a first refractory lining positioned against the lower portion of said one side of said evaporation panel;
    (c) a second refractory lining forming a wall above and continuous with said first lining thereby forming an interior wall of said furnace, said second lining and the upper portion of said evaporation panel forming a slot therebetween;
    (d) a convection cooling panel positioned in the slot, said vaporizable cooling medium being maintained at a liquid level in said evaporation panel at least up to the bottom of said convection cooling panel, said evaporation panel and said convection panel operating to cool said interior wall of said furnace;
    (e) a first refractory material used for said first lining, said first refractory material not being stable against attack by liquid slag, said first refractory material having a thermal conductivity and said first lining having a thickness such that a solid layer of slag forms on said lining when said evaporation panel and said convection panel are cooling said interior wall; and
    (f) a second refractory material used for said second lining, said second refractory material not being suitable against attack by liquid slag and said second refractory material having a thermal conductivity and said second lining having a thickness such that a solid layer of slag forms on said lining when said evaporation panel and said convection panel are cooling said interior wall.

13. Sidewall according to claim 12 wherein said second refractory lining is made from a carbonaceous material.

14. Sidewall according to claim 12 wherein a ring having an internal channel for circulation of a cooling medium is located in an intermediate zone between the lower end of the convection cooling panel and the evaporation cooling panel.

15. Sidewall according to claim 12 wherein a pipe extends from the outside of the evaporation cooling panel to the boundary between the first refractory lining and the evaporation cooling panel.

16. Sidewall according to claim 12 wherein an outer evaporation cooling panel is arranged at substantially the same vertical level but at a radial distance from the evaporation cooling panel.

17. Sidewall according to claim 16 wherein the radial annulus between the evaporation cooling panel and the outer evaporation cooling panel is filled with a refractory material.

* * * * *

UNITED STATES PATENT AND TRADEMARK OFFICE
CERTIFICATE OF CORRECTION

PATENT NO. : 4,674,728

DATED : June 23, 1987

INVENTOR(S) : Jan A. Aune, et al.

It is certified that error appears in the above-identified patent and that said Letters Patent is hereby corrected as shown below:

Column 1, line 25, change "are A" to --area--.

Column 3, line 36, change "froozen" to --frozen--.

Column 5, line 5, change "froozen" to --frozen--.

Column 5, line 7, change "froozen" to --frozen--.

Column 6, line 40, change "panels" to --panel--.

Column 6, line 52, change "vaporized" to --vaporizable--.

Signed and Sealed this

Eighth Day of December, 1987

Attest:

DONALD J. QUIGG

*Attesting Officer*  *Commissioner of Patents and Trademarks*